US008811585B1

(12) United States Patent
Christopher et al.

(10) Patent No.: US 8,811,585 B1
(45) Date of Patent: Aug. 19, 2014

(54) COMMUNICATION ROUTING PLANS THAT ARE BASED ON COMMUNICATION DEVICE CONTACT LISTS

(75) Inventors: Kevin Robert Christopher, Reston, VA (US); D. Mitchell Carr, Potomac Falls, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 1409 days.

(21) Appl. No.: 11/876,827

(22) Filed: Oct. 23, 2007

(51) Int. Cl.
*H04M 3/42* (2006.01)
*H04M 11/00* (2006.01)

(52) U.S. Cl.
USPC .............. 379/201.02; 379/211.02; 379/93.23

(58) Field of Classification Search
CPC ......... H04L 67/18; H04L 51/38; H04L 67/24; H04L 51/043; H04L 61/1594; H04L 29/12594; H04M 2242/30; H04M 3/42102; H04M 3/42348; H04M 1/274583; H04M 2207/206; H04M 3/42357; H04M 3/42365; H04M 7/0075; H04M 7/128
USPC .......... 379/221.14, 272, 273, 220.01, 221.06, 379/221.01, 221.07, 221.09, 93.23, 88, 211, 379/212.01, 218, 266.1, 355; 370/352, 356, 370/353, 354, 355, 357; 455/456.3, 459, 455/560, 461; 707/102
See application file for complete search history.

(56) References Cited

U.S. PATENT DOCUMENTS

| | | |
|---|---|---|
| 4,475,009 A | 10/1984 | Rais et al. |
| 4,670,628 A | 6/1987 | Boratgis et al. |
| 4,677,663 A | 6/1987 | Szlam |
| 5,062,133 A | 10/1991 | Melrose |
| 5,375,161 A | 12/1994 | Fuller et al. |
| 5,592,541 A | 1/1997 | Fleischer, III et al. |
| 6,160,877 A | 12/2000 | Tatchell et al. |
| 6,185,283 B1 | 2/2001 | Fuller et al. |
| 7,062,028 B2 | 6/2006 | Holt et al. |
| 7,933,587 B1 * | 4/2011 | Swan ........................ 455/412.1 |
| 2002/0107045 A1 | 8/2002 | Gancarcik et al. |
| 2004/0005042 A1 * | 1/2004 | Dhara et al. ............. 379/142.01 |
| 2004/0028208 A1 * | 2/2004 | Carnazza et al. ........ 379/221.01 |
| 2004/0218748 A1 * | 11/2004 | Fisher ...................... 379/221.01 |
| 2005/0032527 A1 * | 2/2005 | Sheha et al. ............... 455/456.1 |
| 2005/0041793 A1 * | 2/2005 | Fulton et al. ............. 379/211.01 |
| 2005/0059418 A1 | 3/2005 | Northcutt |
| 2005/0157858 A1 * | 7/2005 | Rajagopalan et al. ..... 379/93.23 |
| 2005/0243993 A1 * | 11/2005 | McKinzie et al. ........ 379/355.04 |
| 2006/0098577 A1 * | 5/2006 | MeLampy et al. ............ 370/238 |
| 2007/0041556 A1 * | 2/2007 | Rana et al. ............... 379/218.01 |
| 2007/0041557 A1 * | 2/2007 | Chatterjee et al. ........ 379/218.01 |
| 2007/0112964 A1 * | 5/2007 | Guedalia et al. .............. 709/227 |
| 2008/0133580 A1 * | 6/2008 | Wanless et al. ................ 707/102 |
| 2008/0247531 A1 * | 10/2008 | Borislow et al. ......... 379/218.01 |
| 2008/0291896 A1 * | 11/2008 | Tuubel et al. ................. 370/352 |
| 2009/0010417 A1 * | 1/2009 | McGary et al. .......... 379/218.01 |
| 2009/0262668 A1 * | 10/2009 | Hemar et al. .................. 370/260 |
| 2009/0285370 A1 * | 11/2009 | Pines et al. ................. 379/88.16 |
| 2010/0061542 A1 * | 3/2010 | Marwell et al. .......... 379/218.01 |
| 2011/0256889 A1 * | 10/2011 | Polis et al. ................. 455/456.3 |

* cited by examiner

*Primary Examiner* — Fan Tsang
*Assistant Examiner* — Kharye Pope

(57) ABSTRACT

A communication system periodically receives contact lists from communication devices. The communication system processes the contact lists to generate a routing plan. The communication system routes incoming communications to at least one of the communication devices based on the routing plan.

20 Claims, 5 Drawing Sheets

COMMUNICATION ROUTING PLANS THAT ARE BASED ON COMMUNICATION DEVICE CONTACT LISTS

TECHNICAL FIELD

The invention is related to the field of communications, and in particular, to systems and methods of processing contact lists to develop routing plans.

TECHNICAL BACKGROUND

Most wireless telephones and personal digital assistants have contact lists that are used to make voice calls and send text messages or emails. To generate a contact list, the user enters contact names and associated contact items. The contact names identify a person, business, or some other entity. The contact items enable communication with the associated contact name, such as telephone number or e-mail address for the associated contact name. The user may then place calls or send text messages and emails through their contact list. Unfortunately, existing communication systems do not take advantage of these contact lists to provide more intelligent communication services.

TECHNICAL SUMMARY

A communication system and its method of operation are disclosed where a plurality of communication devices have individually associated contact lists. The communication system periodically receives the contact lists from the communication devices. The communication system processes the contact lists to generate a routing plan. The communication system receives and processes a communication request and the routing plan to route an associated communication to at least one of the communication devices. In some examples, the communication system obtains instructions from one or more of the communication devices to clarify or approve the routing plan.

DETAILED DESCRIPTION

Figure 1:
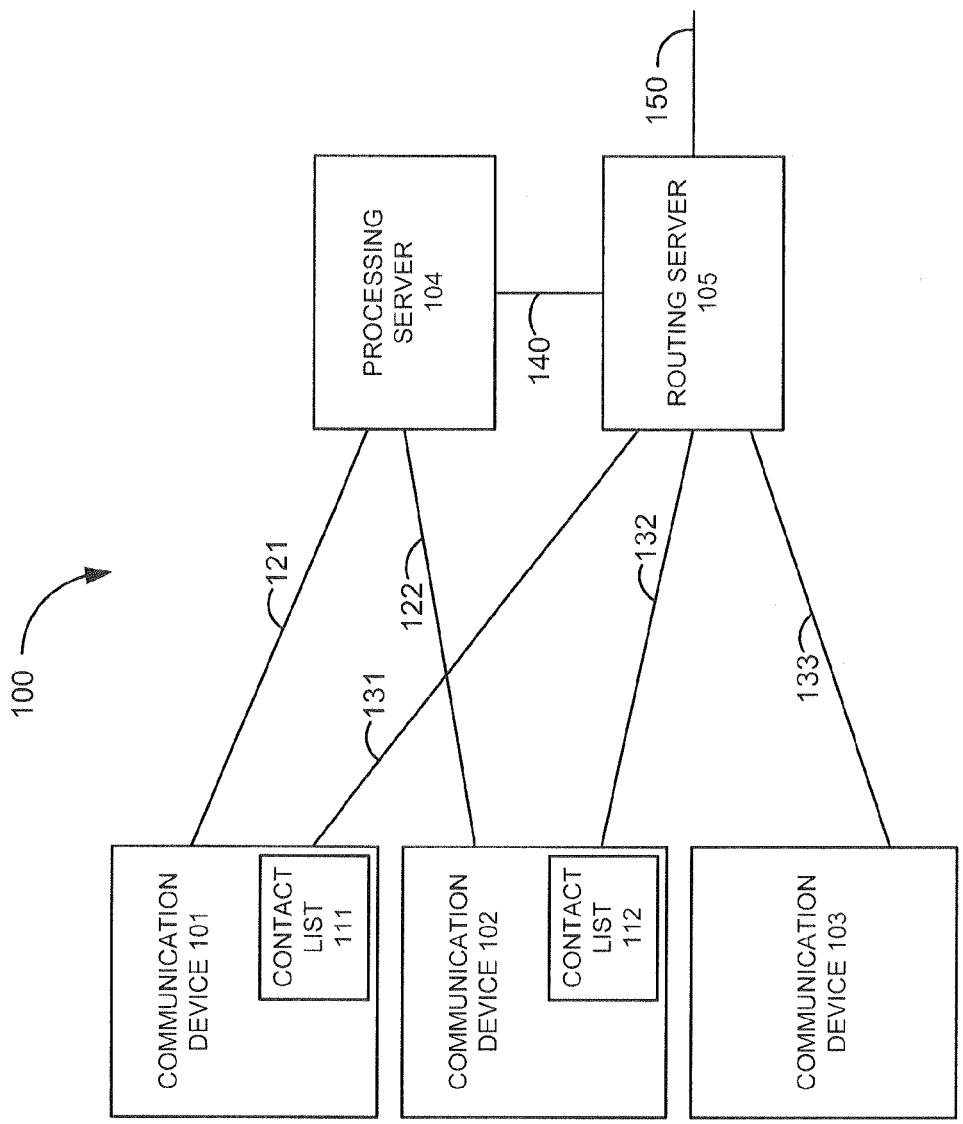
FIG. 1 is a block diagram that illustrates a communication system.

FIG. 1 is a block diagram that illustrates communication system 100. Communication system 100 includes communication devices 101-103, processing server 104, and routing server 105. Communication devices 101-102 include respective contact lists 111-112. Communication devices 101-102 communicate with processing server 104 via links 121-122. Communication devices 101-103 communicate with routing server 105 via links 131-133. Processing server 104 communicates with routing server 104 via link 140. Routing server 105 communicates with external systems (not shown) via link 150.

Communication devices 101-103 comprise communication circuitry and user interfaces, such as telephones, personal digital assistants, computers, internet appliances, and the like. Contact lists 111-112 comprise contact names and associated contact items. Processing server 104 and routing server 105 comprise processing and communication circuitry. Processing server 104 and routing server 105 may be integrated together or distributed across multiple devices. Links 121-122, 131-133, 140, and 150 comprise wireless or wire line communication connections. Links 121-122, 131-133, 140, and 150 may be direct links or they may include various intermediate systems and components.

Users operate communication devices 101-102 to generate contact lists 111-112. Processing server 104 obtains and processes contact lists 111-112 to generate a routing plan. Processing server 104 provides the routing plan to routing server 105. Routing server 105 receives communications over link 150 that are directed to communication device 103. Based on the routing plan, routing server 105 may route these communications to communication device 103, however, routing server 105 may instead re-direct these communications to communication devices 101-102.

Figure 2:
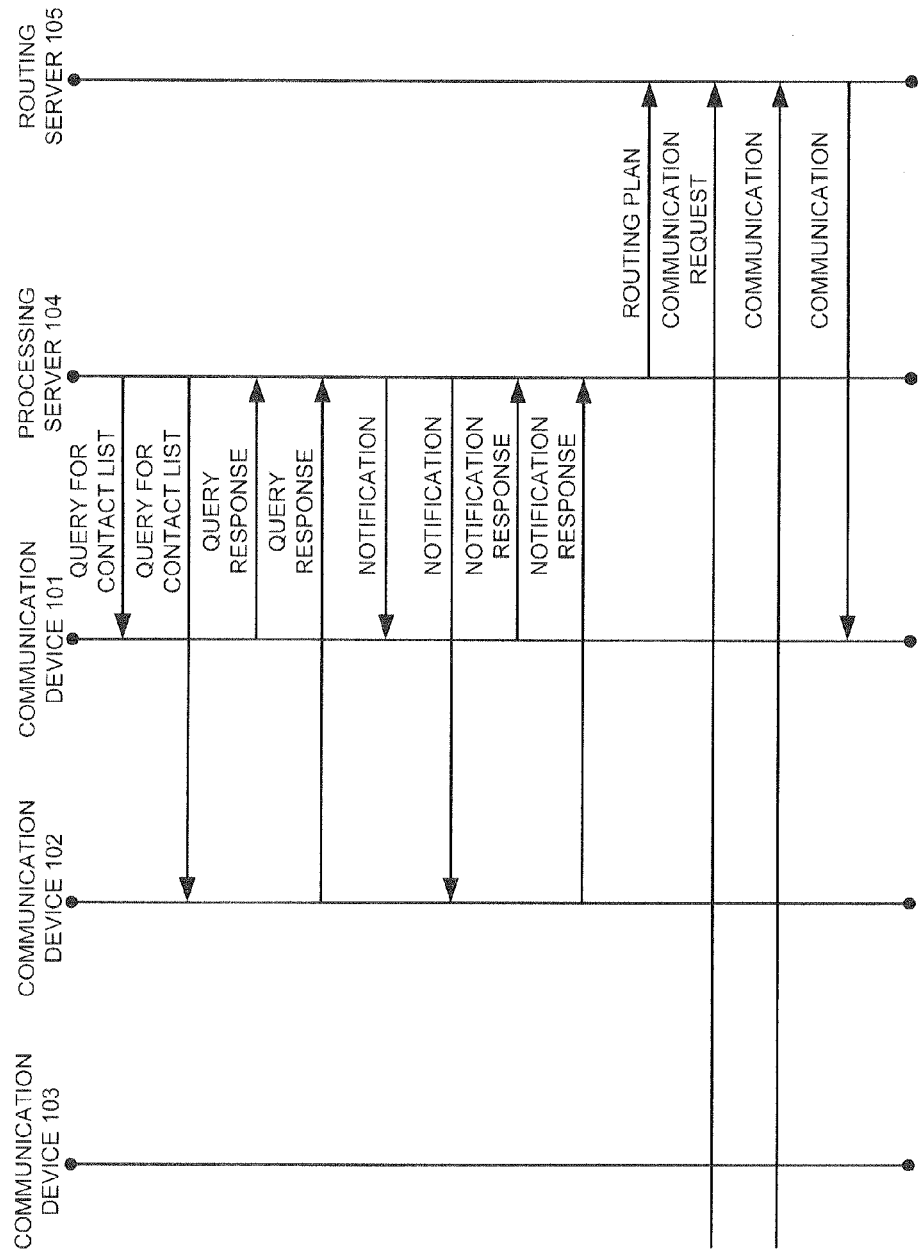
FIG. 2 is a sequence chart that illustrates a method of operating a communication system.

FIG. 2 is a sequence chart that illustrates a method of operating communication system 100. Processing server 104 queries communication devices 101-102 for contact lists 111-112. Communication device 101 sends a query response to processing server 104 with contact list 111. Communication device 102 sends a query response to processing server 104 with contact list 112. Processing server 104 processes contact lists 111-112 to generate a routing plan.

To generate the routing plan, processing server 104 processes contact lists 111-112 to identify contact items that are present in only one of the contact lists 111-112. The routing plan will redirect communications for communication device 103 to the one of communication devices 101-102 that is associated with that one contact list. For example, if only contact list 111 has a contact item of telephone number (303) 555-1111, then telephone calls from (303) 555-1111 to communication device 103 would be redirected to communication device 101.

Processing server 104 also processes contact lists 111-112 to identify contact items that are present in both contact lists 111-112. If the same contact item is in both contact lists 111-112, then processing server 104 notifies associated communication devices 101-102 of this condition, and communication devices 101-102 each send notification responses to processing server 104. Processing server 104 processes these notification responses to generate the routing plan. For example, if both contact lists 111-112 have the same contact item (303) 555-1111, then processing server 104 will notify communication devices 101-102 of the condition to obtain routing instructions for communications from (303) 555-1111. The routing instructions indicate where communications from (303) 555-1111 should be routed, and processing server 104 implements the routing instructions in the routing plan.

The routing instructions in the responses may indicate that one, both, or neither of communication devices 101-102 should receive a communication from a particular contact item. For example, if both contact lists 111-112 have the same contact item (303) 555-1111, then the response from communication device 101 may request communications from (303) 555-1111, but the response from communication device 102 may deny communications from (303) 555-1111. Thus, communications from (303) 555-1111 to communication device 103 would be redirected to communication device 101 but not to communication device 102. Alternatively, the responses from communication devices 101-102 may both request communications from (303) 555-1111, and communications from (303) 555-1111 to communication device 103 would be redirected to both communication devices 101-102. In another alternative, the responses from communication devices 101-102 may both deny communications from (303) 555-1111, and communications from (303) 555-1111 to communication device 103 would be routed to communication device 103.

Processing server 104 transfers the routing plan to routing server 105. Routing server 105 subsequently receives a communication request for a communication directed to communication device 103 and processes the communication request and the routing plan to determine if the communication should be redirected to communication device 101 or communication device 102. Routing server 105 obtains information from the communication request that identifies the sender of the communication, such as a telephone number or internet address. Routing server 105 then attempts to match this sender information with an associated routing instruction. Subsequently, routing server 105 receives the communication and routes the communication to one or more of communication devices 101-103 based on the routing plan. In this example, routing server 105 routes the communication to communication device 101—even though the communication was originally directed to communication device 103.

Figure 3:
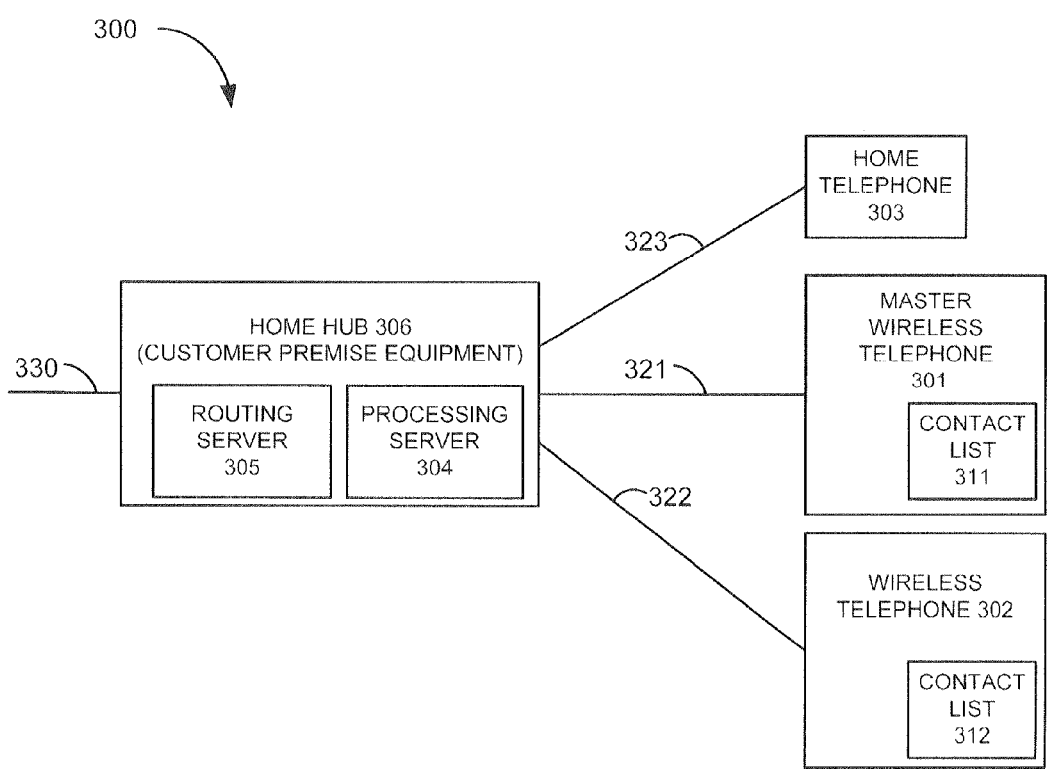
FIG. 3 is a block diagram that illustrates a customer premise communication system.

FIG. 3 is a block diagram that illustrates customer premise communication system 300. Communication system 300 includes master wireless telephone 301, wireless telephone 302, home telephone 303, and home hub 306. Master wireless telephone 301 includes associated contact list 311. Wireless telephone 302 includes associated contact list 312. Home telephone 303 communicates with home hub 306 via link 323. Master wireless telephone 301 communicates with home hub 306 via link 321. Wireless telephone 302 communicates with home hub 306 via link 322.

Home hub 306 communicates with an external communication system (not shown) via link 330. Home hub 306 comprises processing server 304 and routing server 305. Home hub 306 comprises processing and communication circuitry, such as a modem, computer, wireless transceiver, voice over internet protocol gateway, or the like.

Figure 4:
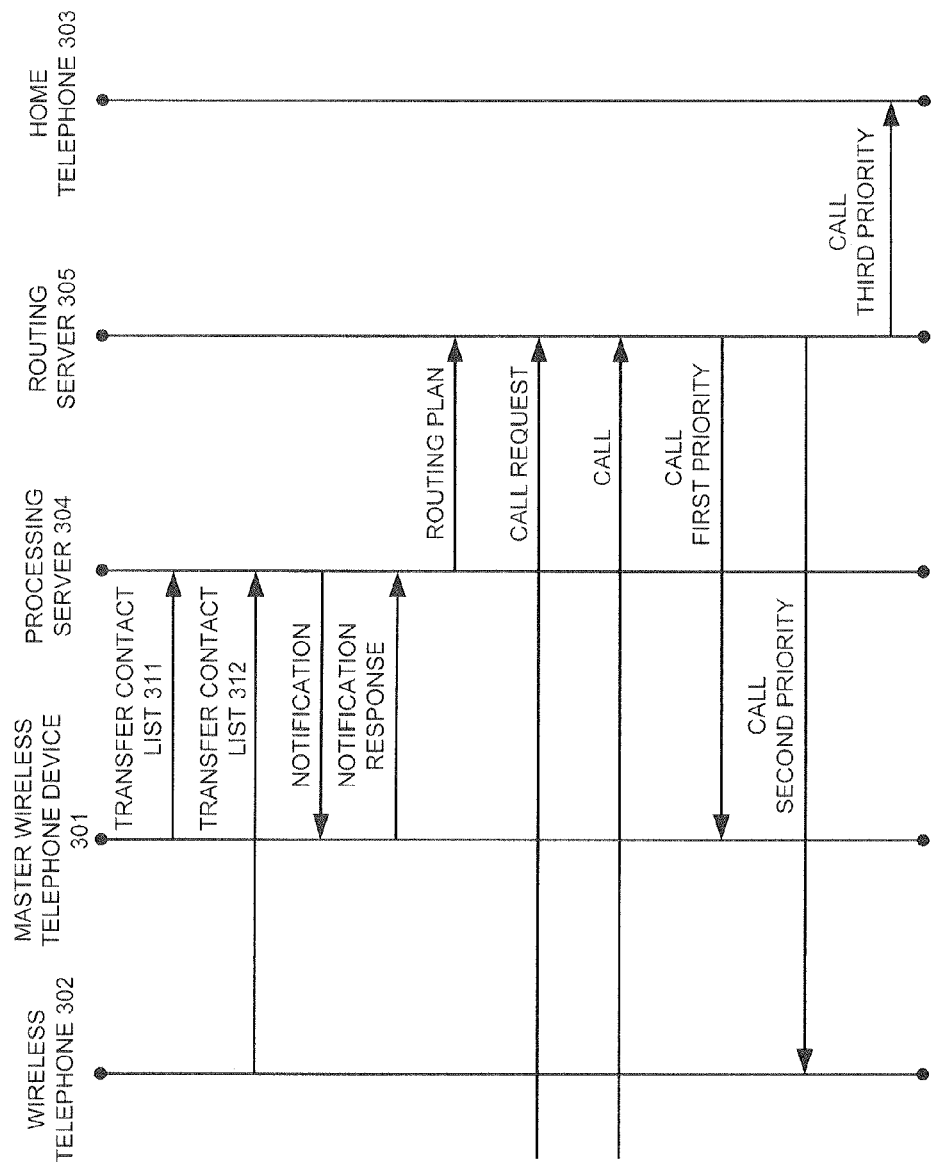
FIG. 4 is a sequence chart that illustrates a method of operating a customer premise communication system.

FIG. 4 is a sequence chart that illustrates a method of operating customer premise communication system 300. Master wireless telephone 301 transfers contact list 311 to processing server 304 in response to a change to contact list 311. Wireless telephone 302 transfers contact list 312 to processing server 304 in response to a change to contact list 312.

Processing server 304 processes contact lists 311-312 to generate a routing plan. During this process, processing server 304 notifies master wireless telephone 301 to obtain responses that clarify and approve of any routing changes. For example, if only contact list 312 has contact item (303) 555-1111, then telephone calls from (303) 555-1111 to home telephone 303 will be redirected to associated wireless telephone 302 if master wireless telephone 301 approves this routing change. If both contact lists 311-312 have the same contact item (303) 555-1111, then telephone calls from (303) 555-1111 to home telephone 303 will be redirected to one or both of wireless telephones 301-302 based on routing instructions from master wireless telephone 301. Processing server 304 transfers the routing plan to routing server 305. Routing server 305 receives a call from an external system directed to home telephone 303 and routes the call based on the routing plan. The routing plan routes incoming calls to one or more telephones as specified by master wireless telephone 301.

In this example, the routing plan implements a routing priority specified by master wireless telephone 301. Routing server 305 receives a call and routes the call to master wireless telephone 301 on a first priority if master wireless telephone 301 is available. Routing server 305 then routes the call to wireless telephone 302 on a second priority if wireless telephone 302 is available. Finally, routing server 305 routes the call to home telephone 303 on a third priority.

Figure 5:
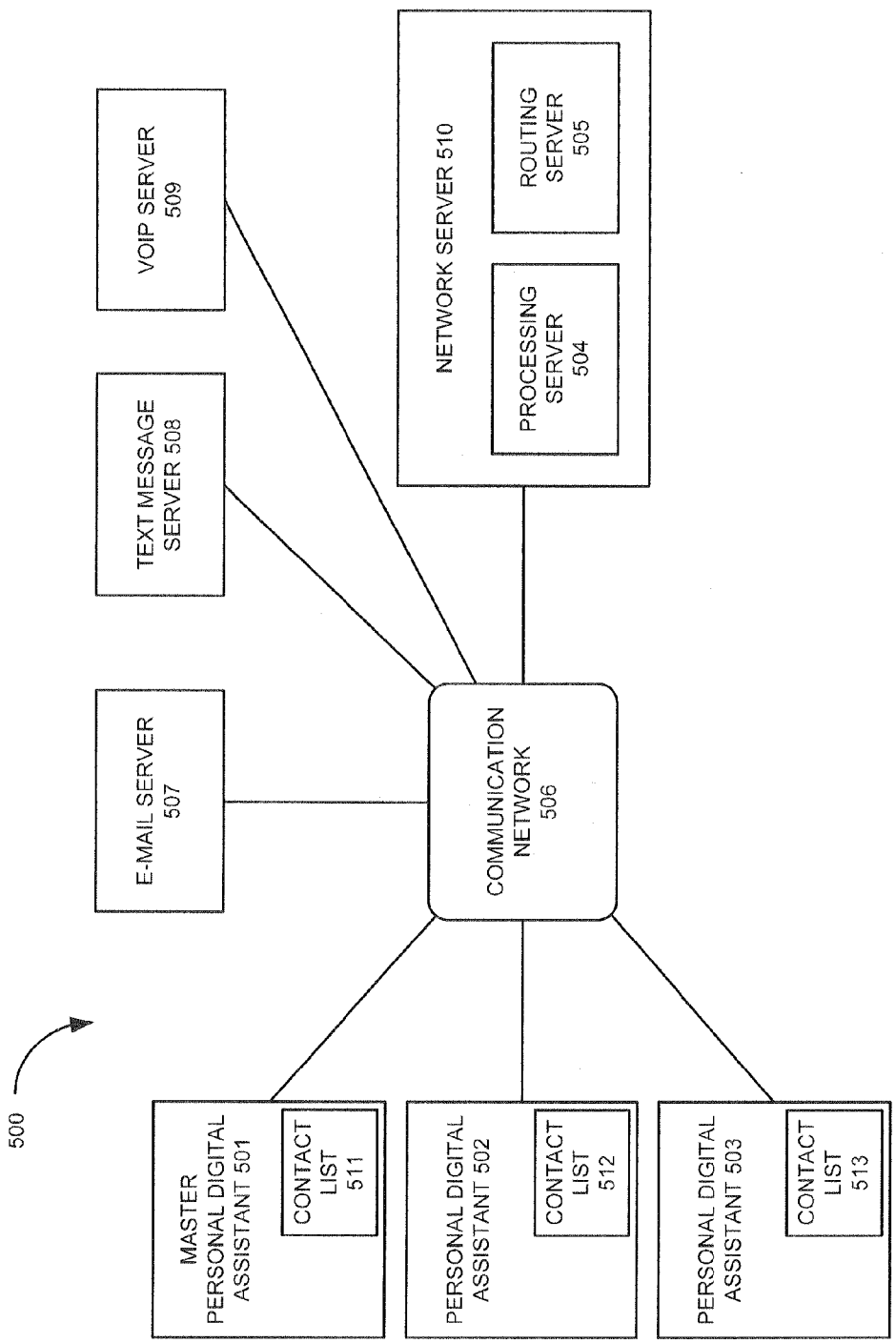
FIG. 5 is a block diagram that illustrates a networked communication system.

FIG. 5 is a block diagram that illustrates networked communication system 500. Networked communication system 500 includes master personal digital assistant 501, personal digital assistants 502-503, communication network 506, e-mail server 507, text message server 508, Voice Over Internet Protocol (VOIP) server 509, and network server 510. Network server 510 comprises processing server 504 and routing server 505. Digital assistants 501-503 respectively include individually associated contact lists 511-513.

Digital assistants 501-503 send contact lists 511-513 to processing server 504—typically in response to a user change to the contact lists. Processing server 504 processes contact lists 511-513 to generate a routing plan. During this process, processing server 504 obtains instructions and approval from master personal digital assistant 501 for implementation and changes to the routing plan.

When e-mail server 507 receives an e-mail directed to one of digital assistants 501-503, then e-mail server 507 transfers a route request to routing server 505. The route request identifies the sender and recipient of the e-mail. Routing server 504 processes the route request and the routing plan to generate a route instruction indicating the digital assistant (or email address/network address) that should receive the e-mail. Routing server 505 transfers the route instruction to the e-mail server 507. E-mail server 507 transfers the e-mail as specified by the route instruction. E-mail server 507 may re-address the email or encapsulate the e-mail in another e-mail to accomplish the e-mail redirection.

When text message server 508 receives a text message directed to one of digital assistants 501-503, then text message server 508 transfers a route request to routing server 505. The route request identifies the sender and recipient of the text message. Routing server 504 processes the route request and the routing plan to generate a route instruction indicating the digital assistant (or telephone number/internet address) that should receive the text message. Routing server 505 transfers the route instruction to text message server 508. Text message server 508 transfers the text message as specified by the route instruction. Text message server 508 may re-number the text message or encapsulate the text message in another text message to accomplish the text message redirection.

When VOIP server 509 receives a call directed to one of digital assistants 501-503, then VOIP server 509 transfers a route request to routing server 505. The route request identifies the caller number and the called number. Routing server 505 processes the route request and the routing plan to generate a route instruction indicating the digital assistant (or telephone number/internet address) that should receive the call. Routing server 505 transfers the route instruction to VOIP server 509. VOIP server 509 routes the call as specified by the route instruction. VOIP server 509 may change the called number or use a different internet address to accomplish the call redirection.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
   in a processing server, periodically receiving a plurality of contact lists from a plurality of communication devices wherein each one of the contact lists is individually associated with one of the communication devices;
   in the processing server, processing the contact lists to generate a routing plan for routing communication sessions to ones of the plurality of communication devices through the communication system wherein the routing plan indicates to redirect at least an incoming communication session intended for a first communication device to at least one other communication device based on contact items present in the plurality of communication devices;
   in the processing server, transferring the routing plan for delivery to a routing server;
   in the routing server, receiving a communication request for a first communication session through the communication system; and
   in the routing server, processing the communication request and the routing plan to identify a route through the communication system for the first communication session associated with the communication request to at least one of the communication devices.

2. The method of claim 1 wherein processing the contact lists to generate the routing plan comprises determining if a first contact item is present in multiple ones of the contact lists.

3. The method of claim 2 wherein processing the contact lists to generate the routing plan comprises notifying each one of the communication devices associated with the first contact item present in the multiple ones of the contact lists.

4. The method of claim 3 wherein processing the contact lists to generate the routing plan comprises receiving responses to the notifications and processing the responses to generate the routing plan.

5. The method of claim 2 wherein processing the contact lists to generate the routing plan comprises notifying a master one of the communication devices of the first contact item present in the multiple ones of the contact lists.

6. The method of claim 5 wherein processing the contact lists to generate the routing plan comprises receiving a response to the notification and processing the response to generate the routing plan.

7. The method of claim 6 wherein the response to the notification comprises a communication routing priority and wherein generating the routing plan comprises generating the routing plan based on the communication routing priority.

8. The method of claim 1 wherein periodically receiving the contact lists comprises querying the communication devices for the contact lists.

9. The method of claim 1 wherein receiving and processing the contact lists to generate the routing plan comprises processing the contact lists in a network server.

10. The method of claim 1 wherein receiving and processing the contact lists to generate the routing plan comprises processing the contact lists in customer premises equipment.

11. A communication system comprising:
    a processing server configured to periodically receive a plurality of contact lists from a plurality of communication devices wherein each one of the contact lists is individually associated with one of the communication devices, and process the contact lists to generate a routing plan for routing communication sessions to ones of the plurality of communication devices through the communication system wherein the routing plan indicates to redirect at least an incoming communication session intended for a first communication device to at least one other communication device based on contact items present in the plurality of communication devices;
    a routing server configured to receive the routing plan and a communication request for a first communication session through the communication system, and process the communication request and the routing plan to identify a route through the communication system for the first communication session associated with the communication request to at least one of the communication devices.

12. The communication system of claim 11 wherein the processing server is configured to process the contact lists to determine if a first contact item is present in multiple ones of the contact lists.

13. The communication system of claim 12 wherein the processing server is configured to notify each one of the communication devices associated with the first contact item present in the multiple ones of the contact lists.

14. The communication system of claim 13 wherein the processing server is configured to receive responses to the notifications and process the responses to generate the routing plan.

15. The communication system of claim 12 wherein the processing server is configured to notify a master one of the communication devices of the first contact item present in the multiple ones of the contact lists.

16. The communication system of claim 15 wherein the processing server is configured to receive a response to the notification and process the response to generate the routing plan.

17. The communication system of claim 16 wherein the response to the notification comprises a communication routing priority and wherein the processing server is configured to generate the routing plan is based on the communication routing priority.

18. The communication system of claim 11 wherein the processing server is configured to periodically query the communication devices for the contact lists.

19. The communication system of claim 11 wherein the processing server is located in a network server.

20. The communication system of claim 11 wherein the processing server is located in customer premises equipment.

* * * * *